(12) United States Patent
Averbuch et al.

(10) Patent No.: US 10,063,581 B1
(45) Date of Patent: *Aug. 28, 2018

(54) MEASURE BASED ANOMALY DETECTION

(71) Applicant: ThetaRay Ltd., Hod HaSharon (IL)

(72) Inventors: Amir Averbuch, Tel-Aviv (IL); Gil Shabat, Hod Hasharon (IL); Erez Shabat, Ra'anana (IL); Devid Segev, Lapid (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/921,227

(22) Filed: Mar. 14, 2018

Related U.S. Application Data

(63) Continuation of application No. 14/796,339, filed on Jul. 10, 2015, now Pat. No. 9,942,254.

(60) Provisional application No. 62/022,672, filed on Jul. 10, 2014.

(51) Int. Cl.
*H04L 29/06* (2006.01)

(52) U.S. Cl.
CPC ........ *H04L 63/1425* (2013.01); *H04L 63/145* (2013.01)

(58) Field of Classification Search
CPC ... H04L 63/1425; H04L 63/145; H04L 63/14; G06F 17/30598
USPC .......................................................... 726/23
See application file for complete search history.

(56) References Cited

U.S. PATENT DOCUMENTS

| 8,225,402 B1* | 7/2012 | Averbuch | G06F 21/554 717/141 |
|---|---|---|---|
| 2009/0300765 A1* | 12/2009 | Moskovitch | G06F 21/562 726/24 |
| 2013/0245883 A1* | 9/2013 | Humphrey | G07C 5/0841 701/36 |

OTHER PUBLICATIONS

Juvonen, Antti, and Tuomo Sipola. "Adaptive framework for network traffic classification using dimensionality reduction and clustering." Ultra Modern Telecommunications and Control Systems and Workshops (ICUMT), 2012 4th International Congress on. IEEE, 2012.*
Wilson, Andrew, and Ryan Adams. "Gaussian process kernels for pattern discovery and extrapolation." Proceedings of the 30th International Conference on Machine Learning (ICML-13). 2013.*
R.R. Colfman and S. Lafon, "Diffusion Maps", Appliedand Computational Harmonic Analysis, 21(1), pp. 5-30, 2006.
H.Cheng et al., "On the compression of low rank martices", SIAM Journal on Scientific Computing, 26(4), pp. 1389-1404, 2005.
P. Martinssonet et al., "A randomized algorithm for the decomposition of matrices", Applied and Computational Harmonic Analysis, 30(1), pp. 47-68, 2011.
T.F. Gonzalez, "Clustering to minimize the maximum inter-cluster distance", Theoretical Computer Science, 38, pp. 293-306, 1985.
Y. Eldar et al., "The farthest point strategy for progressive image sampling", IEEE Trans. Image Processing, 6, 1315, 1997.

(Continued)

*Primary Examiner* — Yogesh Paliwal

(57) ABSTRACT

Method and system for detecting an unknown undesirable event, such as (but not limited to) a cyber-threat, a cyber-intrusion, a financial fraud event or a monitored process malfunction of breakdown. An exemplary method embodiment comprises obtaining a dataset comprising a plurality n of multidimensional data points with a dimension m≥2 wherein each data point is a vector of m features, processing the MDPs using measure-based diffusion maps to embed the MDPs into a lower dimension embedded space, and detecting in the embedded space an abnormal MDP without relying on a signature of a threat, the abnormal MDP being indicative of the unknown undesirable event.

20 Claims, 4 Drawing Sheets

(56) References Cited

OTHER PUBLICATIONS

C. Yang et.al., "Improved fast Gauss transform and efficient kernel density estimation", Computer Vision, 2003, Proceedings, Ninth IEEE International Conference, pp. 664-671, 2003.
L. Greengard and V.Rokhlin, "A fast algorithm for particle simulations", Journal of Computational Physics, 73(2), pp. 325-348, 1987.
W. H. Press et al., "Numerical Recipes in C: The Art of Scientific Computing", 2nd Edition, Cambridge University Press, pp. 791-794, 1992.
A. Bermanis et al. "Multiscale data sampling and fuction extension", Applied and Computational Harmonic Analysis, 34,pp. 15-29, 2013.
R. Coifman and S. Lafon, "Geometric Harmonics: A novel tool for multiscale out-of-sample extension of empirical functions", Applied and Computational Harmonic Analysis, 21(1):pp. 31-52,2006.

* cited by examiner

MEASURE BASED ANOMALY DETECTION

CROSS REFERENCE TO RELATED APPLICATIONS

This application is a Continuation application from U.S. patent application Ser. No. 14/796,339 filed Jul. 10, 2015 (now allowed) and claims the benefit of U.S. Provisional Patent Application No. 62/022,672 filed Jul. 10, 2014, which is incorporated herein by reference in its entirety.

FIELD

Embodiments disclosed herein relate in general to detection of anomalies (abnormalities) in N-dimensional data and more specifically to systems and methods for offline and online anomaly detection in such data.

BACKGROUND

Huge amounts of data are generated by many sources. "Data" refers to a collection of organized information, the result of experience, observation, measurement, streaming, computed, sensed or experiment, other information within a computer system, or a set of premises that may consist of numbers, characters, images, or as measurements of observations.

Data is structured in known formats. Non-structured data can be transformed to structured formats. When data is transferred or received continuously or intermittently in a time dependent fashion, the data is said to be "streamed" in a data stream. "Packet-oriented" data refers to a collection of basic units of structured information in a data stream. In communication networks, packet oriented data includes headers and payload. "Connection-oriented" data refers to a collection of packet-oriented data.

Static and dynamic "high dimensional big" data (HDBD) is common in a variety of fields. Exemplarily, such fields include finance, energy, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of "multidimensional data points" (MDPs). A MDP, also referred to as "sample", "sampled data", "point", "vector of observations", or "vector of measurements", is one unit of data from the original (source, raw) HDBD that has the same structure as the original data. A MDP may be expressed by Boolean, integer, floating, binary or real characters. HBDB datasets (or databases) include MDPs that may be either static or may accumulate constantly (dynamic). MDPs may include (or may be described by) hundreds or thousands of parameters (or "features").

The term The term "feature" refers to an individual measurable property of phenomena being observed. A feature may also be "computed", i.e. be an aggregation of different features to an derive average, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features are usually numeric, but may be structural (e.g. as strings also called identifiers).

In an example of communication networks in which each network connection can be described by tens, hundreds and even thousands of parameters, the straightforward features are the different fields in the protocols in different network layers. The extraction of features from the metadata and from the payload of a connection leads to a significant increase in dimensionality. "Metadata" is "data about data" of any sort in any medium. An item of metadata may describe an individual MDP or content item, or a collection of data including multiple content items and hierarchical levels, for example a database schema.

In another example of intelligence applications, a person under surveillance may be described by tens, hundreds and even thousands of features, for example by information about the person's phone calls, location, e-mail activities, financial activities, etc.

HDBD, with all its measured or streamed features and available sources of information (e.g. databases), may be classified as heterogeneous HDBD or simply as "heterogeneous data". The terms "heterogeneous" means that the data includes MDPs assembled from numbers and characters having different meanings, different scales and possibly different origins or sources. Heterogeneous data may change constantly with time, in which case it is referred to as "heterogeneous dynamic" data.

In known art, HDBD is incomprehensible to understand, to draw conclusions from, or to find in it anomalies that deviate from a "normal" behavior. In this description, the terms "anomaly", "abnormality", "malfunction", "operational malfunction", "outlier", "deviation", "peculiarity" and "intrusion" may be used interchangeably. "Anomaly detection" refers to a process that identifies in a given dataset patterns that do not conform to established or expected normal behavior. The detected anomaly patterns often translate into critical and actionable information in many different application domains, such as cyber protection, operational malfunctions, performance monitoring, financial transactions, industrial data, healthcare, aviation, monitoring or process control. It is therefore clear that anomaly detection has huge practical commercial, security and safety implications, to name a few.

Known machine-learning-based anomaly detection methods include usually two sequential steps: training and detection. The training step identifies the normal behavior in training data, defines a distance (affinity or metric) and provides some normal characteristic (profile) of the training data. The affinity may be used to compute deviation of a newly arrived MDP ("NAMDP") from the normal data profile. The detection step computes the affinities for the NAMDP and classifies the NAMDP as either normal or abnormal.

Diffusion maps (DM) are known and described in R. R. Coifman and S. Lafon in Applied and Computational Harmonic Analysis, 21(1), 5-30, 2006. The DM process described therein embeds data into a lower-dimension space such that the Euclidean distance between MDPs in the embedded space approximates the diffusion distance in the original (source) feature space. The dimension of the diffusion space is determined by the underlying geometric structure of the data and by the accuracy of the diffusion distance approximation.

Out-of-sample extension (OOSE) is also known. One way to have an efficient computation of OOSE is based on using Interpolative Decomposition (ID), described in H. Cheng et al., "On the compression of low rank matrices", SIAM Journal on Scientific Computing, 26(4), 1389-1404, 2005. ID is a deterministic algorithm. A faster randomized ID (RID) version appears in P. Martinssonet et al., "A randomized algorithm for the decomposition of matrices", Applied and Computational Harmonic Analysis, 30(1), 47-68, 2011. RID can be accelerated by using either the Farthest Point Sampling (FPS), see T. F. Gonzalez, Clustering to minimize the maximum inter-cluster distance, Theoretical Computer Science, 38, 293-306, 1985), or the Weighted Farthest Point Sampling (WFPS) algorithm, described in Y. Eldar et al., "The farthest point strategy for progressive image sampling", IEEE Trans. Image Processing, 6, 1315, 1997. The WFPS algorithm can be accelerated by using the Inverse Fast Gauss Transform (IFGT) described in C. Yang et. al., "Improved fast Gauss transform and efficient kernel density estimation", Computer Vision, 2003, Proceedings, Ninth IEEE International Conference, 664-671, 2003, that uses the Fast Multiple Method (FMM) described in L. Greengard and V. Rokhlin, "A fast algorithm for particle simulations", Journal of Computational Physics, 73(2), 325-348, 1987.

Anomaly detection in HDBD is critical and in extensive use in a wide variety of areas. For example, anomaly detection is used to identify malicious activities and operational malfunction in network intrusions or financial fraud, customer behavioral change and manufacturing flaws in energy facilities. In financial activities, anomaly detection is used to detect fraud, money laundering and risk management in financial transactions, and to identify abnormal user activities. Anomaly detection in these areas may also be used to detect suspicious terrorist activities.

Another area is customer behavioral analysis and measurement, practiced for example in marketing, social media and e-commerce. In these areas, attempts are made to predict behavior intention based on past customer attitude and social norms. These predictions, in turn, will drive eventually targeted advertisements and online sales. Anomaly detection in this field would relate to monitoring of changes in consumers behavior, which may avoid substantial market losses.

Yet another area involves critical infrastructure systems or process control. In this area, many sensors collect or sense continuously several measurements in a predetermined time unit. When these sensors are connected through a communication network, the area is related to "Industrial Internet" and "Internet of Things". Fusion (combination, unification) of these measurements leads to the construction of a HDBD dataset. Here, anomaly detection may be used exemplarily for fault detection in critical infrastructure or for inspection and monitoring, and enables to perform predictive analytics. While monitoring critical infrastructure resources, anomalies originated from cyber threats, operational malfunction or both can be detected simultaneously.

In an illustrative example of anomaly detection use, an entity such as a network, device, appliance, service, system, subsystem, apparatus, equipment, resource, behavioral profile, inspection machine, performance or the like is monitored per time unit. Assume further that major activities in incoming streamed HDBD obtained through the monitoring are recorded, i.e. a long series of numbers and/or characters are recorded in each time unit. The numbers or characters represent different features that characterize activities in or of the entity. Often, such HDBD has to be analyzed to find specific trends (abnormalities) that deviate from "normal" behavior. An intrusion detection system ("IDS"), also referred to as anomaly detection system or "ADS", is a typical example of a system that performs such analysis. Malfunction is another typical example of an abnormality in a system.

An IDS attempts to detect all types of malicious network traffic and malicious computer uses ("attacks") which cannot be detected by conventional protection means such as firewalls (rules) and IDS (signature based). These attacks may include network attacks against vulnerable services, data driven attacks on applications, host based attacks such as privilege escalation, unauthorized logins and access to sensitive files, malware (viruses, Trojan horses, backdoors and worms) and other sophisticated attacks that exploit every vulnerability in the data, system, device, protocol, webclient, resource and the like. A "protocol" (also called communication protocol) in the field of telecommunications is a set of standard rules for data representation, signaling, authentication and error detection required to send information over a communication channel. The communication protocols for digital computer network communication have many features intended to ensure reliable interchange of data over an imperfect communication channel. A communication protocol means basically certain rules so that the system works properly. Communication protocols such TCP/IP and UDP have a clear structure. SCADA protocols have also a clear structure.

A network IDS (NIDS) tries to detect malicious activities such as denial of service (DoS), distributed DoS (DDoS), port-scans or even attempts to crack into computers by monitoring network traffic while minimizing the rate of false alarms and miss-detections. A NIDS operates by scanning all the incoming packets while trying to find suspicious patterns. If, for example, a large number of requests for TCP connections to a very large number of different ports is observed, one can assume that someone is committing a port scan at some of the computers in the network.

A NIDS has unlimited ability to inspect only incoming network traffic. Often, valuable information about an ongoing intrusion can be learned from outgoing or local traffic as well. Some attacks may even be staged from inside the monitored network or network segment ("internal attacks"), and are therefore not regarded as incoming traffic at all. However, they are considered as major threats that have to be treated. Internal attacks can be either intentional or un-intentional.

Similar problems in identifying abnormalities in data are encountered in many network unrelated applications as mentioned above. One example relates to the control or monitoring of a process that requires detection of any unusual occurrences in real-time. Another example is the real-time (online) detection of operational malfunctions in SCADA protocols. Analysis of SCADA protocols can discover either malware insertion or operational malfunction or both.

Many of the current methods used to extract useful intelligence from HDBD require extensive computational resources, are time consuming, and, when used for anomaly detection, fail to detect anomalies before they become operational. Therefore, there is a need for, and it would be advantageous to have anomaly detection methods and systems that require less computational effort and are faster. There is also a need for anomaly detection methods and systems that can detect unknown anomalies representing unknown attacks or malfunctions. In other words, there is a need for methods and systems that perform automatic or "un-supervised" anomaly detection, defined as detection that does not require rules, signatures, patterns, domain expertise or semantics understanding of the input data. In addition, the number of false alarms should be as low as possible.

SUMMARY

In this description, an "undesirable event" indicated by an anomaly may be any of: a cyber-threat, a cyber-attack, an operational malfunction, an operational breakdown, a process malfunction, a process breakdown, a financial risk event, a financial threat event, a financial fraud event or a financial network intrusion event.

In exemplary embodiments, there are provided methods for detection of anomalies indicative of undesirable events that are unknown before the processing in HDBD (referred to as "unknown" undesirable events) and a system for implementing such methods.

Exemplarily, the HDBD is processed using a Measure-based Gaussian Correlation (MGC) kernel instead of using a Gaussian kernel. The MGC kernel is described in A. Bermanis, G. Wolf, A. Averbuch, "Diffusion-based kernel methods on Euclidean metric measure spaces", denoted hereinafter by ("BWA"), accepted for publication in Applied and Computational Harmonic Analysis. The MGC kernel is defined on the grid X and on the dataset M to be K:X×X→R where the matrix (MGC kernel) K is $$K(x, y) = \sum_{r \in M} \exp(-\|x - r\|/\varepsilon)\exp(-\|y - r\|/\varepsilon)q(r), x, y \in X \quad (1)$$

The MGC kernel includes a measure assumption. The measure assumption represents the locally low dimensional nature of the analyzed data, its distributions and its densities of the data and its transition probabilities. The measure assumption is used to capture non-manifold, locally low-dimensional structures with varying local dimensionality. This is in contrast with diffusion maps (DM) based methods for anomaly detection, as disclosed for example in a previous U.S. patent application Ser. No. 12/263,473, which are solely based on the use of local distances from a Gaussian kernel to recover the underlying geometry without considering a separately-provided measure as the kernel in EQ. 1 does. In other words, the manifold assumption in U.S. patent application Ser. No. 12/263,473 is replaced by a more general measure assumption. There is also a difference in the OOSE for the MGC kernel (OOSE-MGC), see below, vs. the OOSE for the DM kernel used in patent application Ser. No. 12/263,473.

In some exemplary method embodiments, a method comprises the steps of obtaining a dataset comprising plurality N of multidimensional data points (MDPs) having a dimensionM≥2, wherein each MDP is a vector of M features; processing the MDPs using measure-based diffusion maps to embed the MDPs into a lower dimension embedded space; and detecting in the embedded space an abnormal data point without relying on a signature of a threat, the abnormal data point being indicative of the unknown undesirable event. Exemplary MDP features may include:

1. In communication networking data: features from TCP protocol:
Number of TCP/IP packets; number of UDP/IP packets; number of ICMP packets; number of packets which are not TCP, UDP or ICMP; number of TCP packets with TCP flag "syn" ON; number of TCP packets with TCP flag "ack" ON; number of TCP packets with TCP flag "cwr" ON; number of TCP packets with TCP flag "ecn" ON; number of TCP packets with TCP flag "fin" ON; number of TCP packets with TCP flag "ns" ON; number of TCP packets with TCP flag "push" ON; number of TCP packets with TCP flag "res" ON; number of TCP packets with TCP flag "reset" ON; number of TCP packets with TCP flag "urg" ON; number of TCP packets with destination port 80 (HTTP); number of UDP packets with destination port 53 (DNS); number of TCP packets with source port 0; number of data TCP packets which where retransmitted (indication of slow application performance and packet loss); number of control TCP packets (packets without a payload); number of data TCP packets (packets with a payload); number of data TCP bytes (the bytes count of all the payloads); number of TCP connections (sessions); number of completed TCP connections; ratio between the number of TCP packets with reset flag ON and the number of TCP packets with syn flag ON (computed feature); ratio between the number of TCP packets with syn-ack flags and the number of TCP packets with syn flag (computed feature).

2. In process control data: features from a laser machine: Base Plate Temp; BBO temp; Current Crystal; Error Signal Gain; Error Signal Max; Error Signal Min; Error Signal Offset; Etalon Temp; FAP1 Diode Drcv. Curr.; FAP2 Diode Drv. Curr.; Hor. Pos. 1st Quadr. Ph.-D.; Hor. Pos. 2nd Quadr. Ph.-D.; LBO Temp; PD1; PD2; Power Alarm Threshold; Power From Diodel.

3. In financial data: transaction logs; account balance snapshots; customer profiles; applicant information such as income, age, account balance; collateral information such as postal code, property value, property type; application information such as loan type, interest, conditions; In general, each feature can be a measurement (e.g. balance, amount etc.), an identifier (e.g. account number, user id etc.) or a code (status/error code etc.). "Fraud" features may include Scheme, Journal entry, Journal description, Manual insertion, Posted date, Effective date, Period, Debit, Credit, Row ID, Account, Account description.

In an exemplary method embodiment, the step of detecting further includes detecting the abnormal data point without use of a threshold.

In an exemplary method embodiment, the step of detecting further includes detecting the abnormal data point without tuning a method parameter.

In an exemplary method embodiment, the step of processing the MDPs includes normalizing the data to obtain normalized MDPs (NMDPs), constructing a random grid around NMDPs using a measure-based kernel, creating a set of measure-indicating NMDPs (MIPs), calculating a measure of each MIP, embedding the random grid into a lower dimension space using the calculated measure obtain embedded NMDPs (ENMDPs), computing a density estimation value of each ENMDP, and classifying a ENMDP as normal or abnormal using its respective computed density estimation values.

In an exemplary method embodiment, the unknown undesirable event is a cyber-attack.

In an exemplary method embodiment, the unknown undesirable event is an operational malfunction.

In an exemplary method embodiment, the step of obtaining a dataset includes obtaining a dataset from a traffic analyzer configured to process a data stream into the dataset. The traffic analyzer includes a communications network traffic analyzer or a financial network traffic analyzer.

In an exemplary method embodiment, the method further comprises the step of applying an out-of-sample extension (OOSE) procedure that uses the measure-based kernel, the embedded grid and the density estimation values correct to a newly arrived M-dimensional data point that does not belong to the plurality N to determine whether the newly arrived data point is normal or abnormal.

In an exemplary method embodiment, the application of the OOSE procedure is performed without relying on a signature of a threat.

In an exemplary method embodiment, the application of the OOSE procedure is performed without use of a threshold.

In an exemplary method embodiment, the application of the OOSE procedure is performed without tuning a method parameter.

In an exemplary embodiment there is provided a system for detecting an unknown undesirable event, comprising: a processing module configured to receive a dataset comprising a plurality n of MDPs having a dimension m≥2 wherein each MDP is a vector of m features, and to process the MDPs using measure-based diffusion maps to embed the MDPs into a lower dimension embedded space; a detection module configured to detect in the embedded space an abnormal MDP without relying on a signature of a threat, the abnormal MDP being indicative of the unknown undesirable event; and a configuration and operation server operative to configure the processing and detection modules on-the-fly and dynamically.

Inventively, an anomaly detection method and associated system disclosed herein are characterized by not having or using domain expertise, signatures, rules, patterns or semantics understanding of all the available features. An anomaly detection process and associated system disclosed herein are also characterized by not needing, having, or using manifolds.

The description uses communication networks as exemplary entities, without in any way limiting the scope of the description to networks alone. A communication network is just one example of an entity having, producing, supplying or transferring data, and the application of the systems, methods and algorithms described in detail below with reference to metadata or packet data in networks is only one exemplary application that can be extended to any type of data of any other entity.

Throughout the rest of this disclosure, "online" is used among other things to mean a process that can efficiently process the arrival of new samples. To achieve online anomaly detection, most systems use signatures and rules of intrusions, which are developed and assembled manually after a new anomaly is exposed and distributed. This approach is problematic, because these systems detect only already-known intrusions ("yesterday's" attacks and anomalous malfunctions) but fail to detect new attacks ("zero-day" attacks). In addition, they do not cover a wide range of high quality, new, sophisticated emerging attacks that exploit many network vulnerabilities.

Exemplary method embodiments disclosed herein do not use domain expertise, signatures, rules, patterns or semantics understanding of all the available features. Accordingly, an exemplary method disclosed herein detects the anomalous MDP but does not provide the root cause of the occurrence of the anomaly, i.e. does not identify the cause of the undesirable event. In other words, the source of an anomalous MDP (the undesirable event) cannot be classified during the detection stage. The MDP is only classified as an anomalous MDP.

Two anomaly detection modes are presented: offline and online. Both are based on finding the low dimensional intrinsic geometry where the data lies (resides) via the application of the MGC kernel.

In both offline and online processing, anomalies are detected first in a training dataset having training data. "Training data" is data of a finite size, used as a source for learning the behavior and the properties of the data. In offline processing, newly arrived MDPs can be added to the training data and the anomaly detection process is applied from start to the new enhanced training data (which includes now the added newly arrived MDPs). In online processing, embodiments disclosed herein have access only to the training data. The rest of the data (commonly referred to as "testing data") is sensed/streamed/captured constantly in real-time, and classification of each newly arrived MDP (NAMDP) as being either normal or abnormal is done online. In offline processing, it is assumed that the training dataset and the testing dataset are the same.

The MGC Kernel

In various exemplary embodiments, methods disclosed herein utilize the MGC kernel in a similar way to the utilization of diffusion maps to detect anomalies, however without using manifolds as done in DM-based anomaly detection. In MGC kernel based anomaly detection methods disclosed herein, there is no need to find a manifold geometry in the lower dimension space to detect anomalies that deviate from the manifold. Instead, a method disclosed herein finds a distribution of the data points to obtain a density estimation represented by the measure assumption and uses chosen representatives from this distribution to detect anomalies. This process significantly increases the efficiency of the anomaly detection process.

In practice, kernel methods represented by matrices are usually huge in size. For example, with 100,000 samples (measurements) and with each sample including 100 features, the kernel size will be 100,000×100,000 (40 GB if each entry in the kernel is described by 4 bytes—double precision). This kernel size is too large to be manipulated by a computer, yet it is small in comparison with a typical HDBD dataset. The use of only chosen representatives instead of use of the entire dataset for anomaly detection computation, together with use of the properties of the MGC kernel, allow faster and more efficient processing to detect anomalies independently of the intrinsic geometry of the data.

Let $M \subset R^m$ be a dataset with n MDPs that are sampled from $R^m$ according to a measure distribution. In BWA, a data measure distribution q defines the measure. Assume that the number of MDPs in M is sufficiently large to represent (approximate) the distribution q. q can be computed using a density estimator over the set M. q is computed by using exemplarily a uniform grid on which the MGC kernel is defined. The same computation of q can be done also on a non-uniform grid. For the ease of presentation, only a uniform grid is presented.

Let X be a grid that contains a dataset of MDPs spread uniformly on the support of q. The grid is constructed by uniformly sampling ellipsoids of constant semi-axes around each MDP in M. Ellipsoid overlaps (where ellipsoids intersect each other) are removed. Then, the dataset is covered by non-overlapping ellipsoids such that each area is sampled and covered by a unique ellipsoid.

The MGC kernel is defined on grid X and on dataset M. The MGC kernel is then normalized by the degrees $v(x)=\Sigma_{y \in X} K(x,y)$ to obtain diffusion transition probabilities $p(x,y)=K(x,y)/v(x)$ and diffusion affinities $a(x,y)=K(x,y)/(\sqrt{v(x)}\sqrt{v(y)})$ for $x,y \in X$ in a matrix A on the grid. Spectral decomposition of the diffusion affinity matrix A embeds the grid X into a lower dimension space.

An out-of-sample extension (OOSE) embeds each NAMDP into a low dimensional space determined by the decay of the eigenvalues of A. The OOSE may be performed exemplarily as in W. H. Press et al., Numerical Recipes in C: The Art of Scientific Computing, 2nd Edition, Cambridge University Press, 1992, pp. 791-794, ("NR"), as in A. Bermanis et al., "Multiscale data sampling and function extension", Applied and Computational Harmonic Analysis, 34, 15-29, 2013, or as in R. Coifman and S. Lafon, "Geometric Harmonics: A novel tool for multiscale out-of-sample extension of empirical functions", Applied and Computational Harmonic Analysis, 21(1):31-52, 2006. All three references are called hereinafter NYSTROM. The OOSE extends the resulting embedding from the grid to the entire dataset.

BRIEF DESCRIPTION OF THE DRAWINGS

The description is herein described, by way of example only, with reference to the accompanying drawings, wherein.

DETAILED DESCRIPTION

Figure 1:
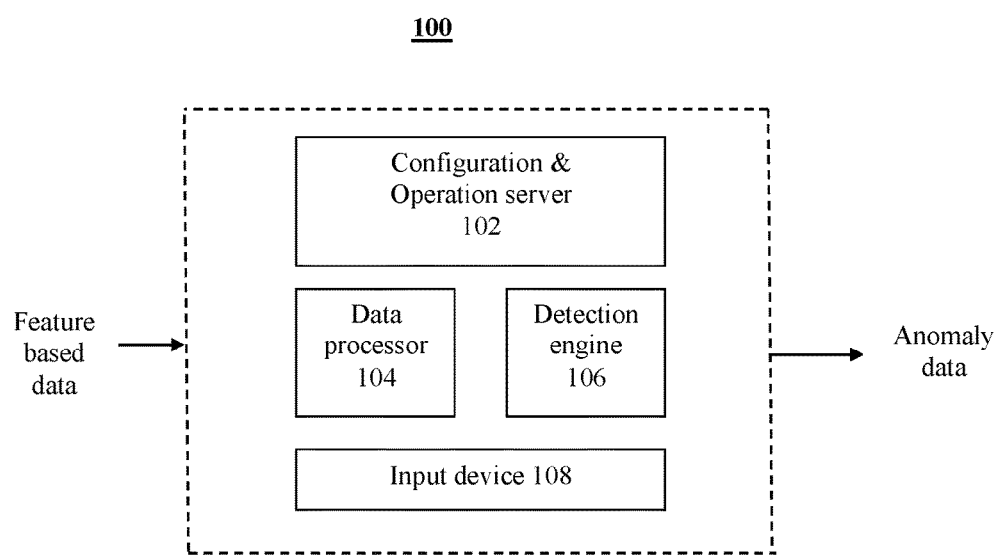
FIG. 1 shows schematically an exemplary embodiment of a system disclosed herein.

FIG. 1 shows schematically an exemplary embodiment of a system disclosed herein and numbered 100. System 100 is dedicated to perform measured-based anomaly detection methods described below. System 100 comprises a configuration and operation server 102 operatively coupled to a data processing module 104, to a detection engine 106 and to an input device 108. Data processing module 104 is configurable to perform steps 302-310 of FIG. 3. Detection engine 106 is operative to detect anomalies by performing step 310.

Server 102 is configurable to perform "on-the-fly dynamic" actions, including addition and/or change and/or removal of data sources; modification of data types and formats; modification of interfaces; modification of operational modes; feature selection; feature enhancement by computation; sorting and data integrity validation; addition, omission and or modification of measures computed on input data; dynamic change of input mechanisms: pull and push, over a variety of collection technologies; performing batch mode, live streaming or both; application of computational measures to the input data features, and further addition, omission and modification of the measure—all done without changing the system software code and without even halting the system's operation. The various configurations and modifications may be done by request of the user transferred via input device 108, which may include a keyboard or a touch screen. The mechanism of pull/push is applied to the input and to the output in the same way.

OOSE for the MGC Kernel (OOSE-MGC)

The OOSE-MGC is an enhanced version of NR OOSE, changed herein to reflect the fact that the MGC kernel is different from the Gaussian kernel in NYSTROM.

The MGC kernel is computed as in EQ. 1. Denote the MGC kernel by K of n×n size (EQ. 1), its $i^{th}$ eigenvector by $\phi_i$, the grid by X and the MIPs by $\mu$. The extension coefficients are computed by:

$$c_i = K^{-1} \cdot \phi_i, \ i=1, \ldots, \delta \quad (2)$$

where $\delta$ is the dimension of the embedded space. There are several ways to compute $\delta$, including by application of singular value decomposition (SVD) to K, see e.g. NR page 59-70. Then, the embedding of a newly arrived MDP y is calculated by computing a new row y in the MGC kernel. K is extended to a (n+1)×n matrix $K_y$ by $$K_y = \begin{cases} K(i, j) & i, j = 1, \ldots, n \\ \vec{K}_y(j) & i = n+1, j = 1, \ldots, n \end{cases} \quad (3)$$

where $$\vec{K}_y = \exp(-\|y - \vec{\mu}\|/\varepsilon) \cdot M \cdot G \quad (4)$$

and $G(x,y) = \exp(-\|X_x - \mu_y\|)$ is the Gaussian distance matrix between the grid X and the MIPS $\mu$. M is a diagonal matrix that contains the values of $\mu$ on its diagonal.

The MGC kernel is then extended by using $K_y$ from EQ. 3 for y and embedding y in the embedding space using the extension coefficients $\{c_i\}$ from EQ. 2, such that the embedded y ($y_{embed}$) is defined as $y_{embed} = \vec{K}_y \cdot C$. The entire process is referred to as "OOSE-MGC".

MGC-Based Anomaly Detection

As indicated above, the anomaly detection provided herein has two operational modes: offline and online. The offline mode (also referred to as training process) is usually applied to a fixed dataset known in advance. The online mode processes newly arrived MDPs that did not participate in the training process. Both processes are performed by system 100.

Offline Mode

Figure 2A:
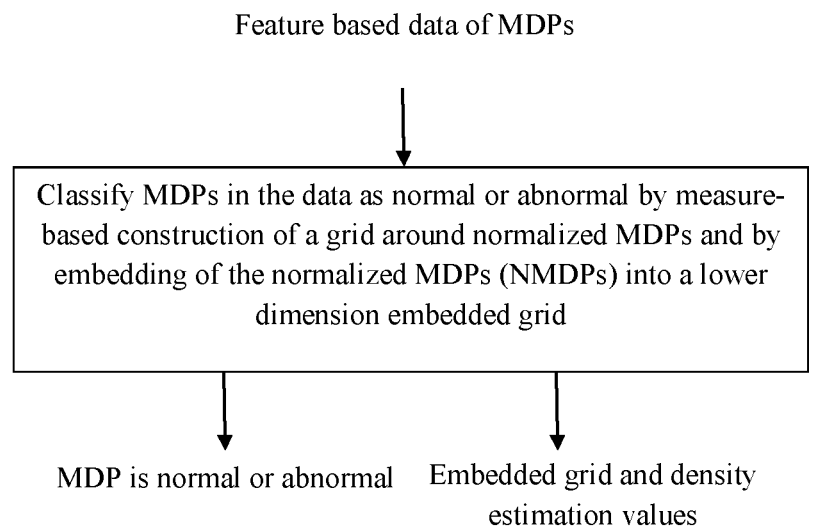
FIG. 2A shows schematically a general overview of the offline mode process in an exemplary embodiment of an anomaly detection method disclosed herein.
Figure 2B:
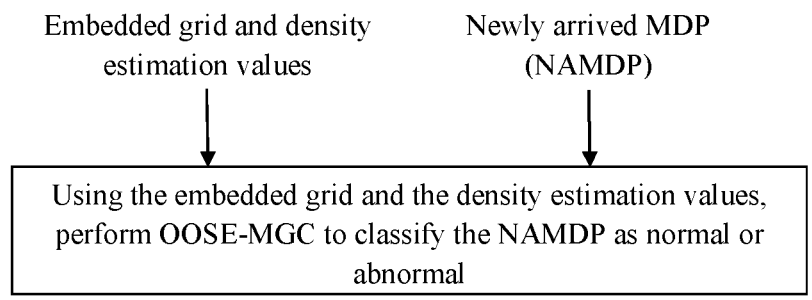
FIG. 2B shows schematically a general overview of the online mode process in an exemplary embodiment of an anomaly detection method disclosed herein.
Figure 3:
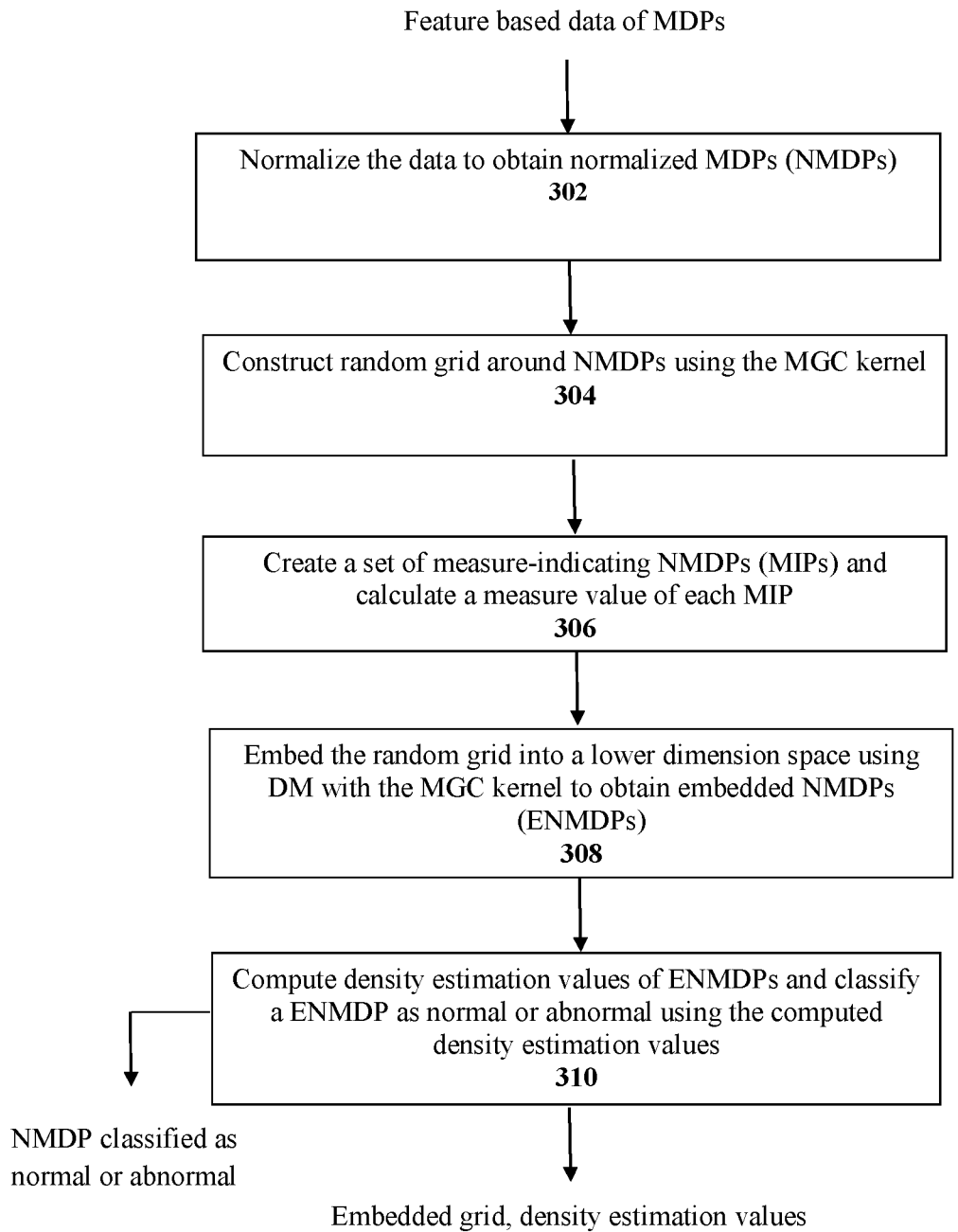
FIG. 3 shows schematically details of an exemplary embodiment of an anomaly detection method disclosed herein.

The offline mode is used to detect anomalies in fully known data. The data can come from different sources. In exemplary embodiments disclosed herein, the offline mode process uses the MGC kernel. FIG. 2A shows schematically a general overview of the offline mode process in an exemplary embodiment. FIG. 2B shows schematically a general overview of the online mode process in an exemplary embodiment. FIG. 3 shows more details of the process.

Raw data obtained from a variety of data sources (e.g. from network traffic, logs, equipment sensors, production data, historian) may have its integrity checked and may be fixed, parsed and arranged in a feature based matrix as known in the art. Assume that the parsed data is $x_1, \ldots, x_n \in R^m$. That is, the parsed data includes n measurements of MDPs, were each MDP has m features (parameters). The data can be viewed as a n×m matrix where each row is a MDP (also referred to as "vector of m measurements"). The average and standard deviation of certain features can be computed and added as computed features. Features from different databases and table sources can be added. Characters and identifiers in the raw data can be manipulated to become computed features. Thus, the original number of features may increase. One example of such addition and enhancement resulting in computed features may be found in the DARPA raw networking data (DARPAN) dataset, M. Mahoney and P. Chan, "An analysis of the 1999 DARPA/Lincoln Laboratory evaluation data for network anomaly detection", Proceeding of Recent Advances in Intrusion Detection (RAID)—2003, volume 2820, pages 220-237. In DARPAN, original features were extracted from a packet oriented communication and additional features were computed from the extracted features and added to the list original features.

The parsed data may optionally be adapted to different interfaces that fit different devices and different subsystems, to provide parsed data as known in the art in the form of a feature based matrix.

The features based data is received by system 100 as an input. In step 302, MDP normalization is performed using data processing module 104. In a first exemplary normalization procedure, the normalization is performed by applying diffusion maps to each column of the n×m feature matrix. This step brings all the features in the data matrix to a common numerical scale. Each column vector i in the parsed data, which corresponds to a specific feature along the number of rows in the matrix, is normalized independently from the other columns in the input matrix as follows:

a) A Gaussian distance matrix $D_i$ is computed from the column vector i (denoted $v_i$) where the value of $D_i(x,y) = e^{-\|x-y\|_2^2/\varepsilon}$ is the Gaussian distance between x and y coordinates of the column vector $v_i$. $\varepsilon$ determines the computational neighborhood of the MGC based kernel. $\varepsilon$ is often determined as the empirical standard deviation of the dataset, however, there exist analytical methods for setting $\varepsilon$, for example as described in M. Hein and Y. Andibert, "Intrinsic dimensionality estimation of sub-manifolds in Euclidean space", Proceedings of the 22nd International Conference on Machine Learning (2005), pp. 289-298 (hereinafter "CEP").

b) $D_i$ is normalized by dividing each entry (x,y) by the sum of row x, which is also referred to as the "degree of x", denoted by $$D_i^x = \sum_{y \in v_i} D_i(x, y).$$

This results in a first Markov distance matrix P whose entries are $p(x,y) = D_i(x,y)/D_i^x$.

c) The eigenvalues and the eigenvectors of the first Markov matrix P are computed. The output from this step is a "normalized" MDP (NMDP).

In a second exemplary normalization procedure, each column vector, which corresponds to the same feature across all the measurements, is normalized as above, independently from the other columns as follows:

a) The standard deviation $\sigma_i$ of the $i^{th}$ column vector $v_i$ in the training data matrix is computed and stored;
b) The mean $\mu_i$ of $v_i$ is computed and stored;
c) The normalization of $v_i$ is done by $$\frac{v_i - \mu_i}{\sigma_i}.$$

d) For each coordinate x in the ith vector, $k(x) = e^{-x/\sigma_i}$ is computed.
e)

$$s_i = \sum_{x \in v_i} k(x)$$

is stored.

The output ($\sigma_i$, $\mu_i$, $v_i$ and $s_i$) is stored in storage 108.

In step 304, a random grid is constructed around NMDPs. The grid of NMDPs (which is a grid spread in the support of the NMDPs) is then embedded into a low-dimensional space using the MGC kernel (EQ. 1). The MGC kernel captures the affinity between the NMDPs with respect to the density (measure).

In an exemplary embodiment and for ease of presentation, the grid is a uniform grid. However, the construction of a uniform grid is also applicable to a non-uniform grid.

In a first exemplary embodiment, the uniform grid is constructed around the NMDPs iteratively as follows: denote the NMDPs as $x_1, \ldots, x_n$. In step number i (iterative step), a multidimensional ellipsoid $o_i$ with constant semi-axes is computed around $x_i$ and a number of NMDPs are uniformly sampled from that ellipsoid. Any NMDP located inside one or more of the ellipsoids $o_1, \ldots, o_{i-1}$ computed in the previous steps is disregarded. All the remaining NMDPs are added to form the grid. This process guarantees that the grid is sampled from non-overlapping ellipsoids that cover the support of the NMDPs. The number of steps is equal to the number of NMDPs. The output of this step is a grid of NMDPs that are spread uniformly in the support of the NMDPs. Each grid point is attributed to the NMDP it originated from.

In a second exemplary embodiment, the grid is constructed using the WFPS algorithm to sample a subset of the NMDPs. First, the density of the NMDPs is computed using a Gaussian window. That is, a density $$\text{density}(x_i) = \sum_{i=1}^{n} e^{-\|x_i - x_j\|_2^2} / \varepsilon$$

of each given NMDP is calculated as the sum of the Gaussian distances between that given NMDP and all the other NMDPs. This allows to reduce the number of NMDPs in the grid and to shorten the execution time of the algorithm while guaranteeing that the grid provides a good cover of the normal NMDPs in the training dataset ("training NMDPs"). The output of step 304 is a random grid of NMDPs.

Measure is computed in step 306. A set of "measure indicating MDPs" (i.e. MDPs that represent the measure) or "MIPs" is chosen, and the measure for each MIP $x_i$ is computed using a density estimator. The MIPs are used to estimate the distribution q of the (normalized) data from step 304. The NMDPs may be designated as MIPs. The measure is computed by using a density estimator that sums the Gaussian distances between each NMDP and all the other NMDPs (or, alternatively, to only nearest-neighbor MDPs that are distance-wise close) as follows:

$$\text{density}(x_i) = \sum_{x} \exp(-\|x - x_i\|_2^2 / \varepsilon). \quad (5)$$

Then, density ($x_i$) becomes the value of a specific MIP $x_i$. $\varepsilon$ is computed. One way to compute $\varepsilon$ is using the procedure described in CEP. The output is a MIP.

Embedding the random grid of NMDPs from step 304 into a lower dimension space to obtain "embedded normalized MDPs" or "ENMDPs" is performed in step 308. The MGC kernel K is computed by EQ. 1 using the set of grid NMDPs $\{x_i\}_{i=1}^{n}$ and the set of MIPs. The kernel's entries are normalized by dividing each entry (x,y) by the sum row x such that $$D_x = \sum_{i=1}^{n} K(x, x_i).$$

This results in a second Markov matrix P, where p(x,y)=K(x,y)/$D_x$. The grid of NMDPs is embedded by DM application into a lower dimension space using the MGC kernel in the following way. The SVD of the second Markov matrix P is computed, and a number of eigenvalues and their corresponding eigenvectors are chosen. The eigenvectors span a low dimensional embedded space. Then, the eigenvectors are scaled by the corresponding eigenvalues raised by the power of a constant t. This reflects an advance in t times of the underlying diffusion process. A number of computations will be performed to find the number of computed eigenvectors according to a desired accuracy δ of the diffusion distance in the original space as the Euclidean distance in the embedding space. This accuracy is achieved by choosing s eigenvectors that correspond to the largest eigenvalue (except for the first), where $$s(\delta,t) = \max\{l \in N \text{ such that } |\lambda_l|^t > \delta |\lambda_1|^t\} \quad (6)$$

and where $\lambda_1$ is the largest eigenvalue and t is the time step.

If the grid matrix is too large and becomes numerically unstable, the ID method may be used exemplarily to choose a subset of columns (which correspond to MDPs) in the embedding procedure as follows: a Gaussian kernel is computed by using the set of NMDPs. Embedding of the NMDPs into a lower dimension space is performed by application of DM using the MGC kernel. Using a large training dataset will result in a large Gaussian kernel that can be numerically instable and with a large condition number. This can somewhat be avoided by applying the RID method to the MGC kernel. This results in a smaller kernel matrix (fewer columns) that approximates well the original kernel matrix that has a much smaller condition number. The performance of the RID can be improved by using the IFGT. The output of this step is an embedded grid of ENMDPs.

The density of ENMDPs is computed in step 310 to identify abnormal NMDPs (and the original respective MDPs) in the embedded space. This is related to the procedure of ellipsoid derivation described above. The ellipsoid semi-axes' lengths correspond to the data's standard deviation of each feature (column). Then, the number of ENMDPs inside the ellipsoid is counted and stored in a vector d, where $d_i$ corresponds to the number of ENMDPs inside the ellipsoid of the $i^{th}$ ENMDP. That is, $d_i=|\{x|x \text{ is in the } i^{th} \text{ ellipsoid}\}$. Step 310 ends with classification of a MDP as normal or abnormal, i.e. results in identification of anomalies. In addition, the output of this step includes the embedded grid of NMPDs and the density estimation values.

The detection (identification) of abnormal (anomalous) MDPs is "un-supervised" or "automatic". A MDP in the training data is classified as an anomaly if it is in the neighborhood of any grid point that was classified as an anomaly or in a neighborhood that does not contain any grid points. Otherwise it is classified as a normal MDP.

In the offline mode process described in steps 302-310 above, anomalies are detected in the entire available training data. In the training phase, as new MDPs arrive, each newly arrived MDP (NAMDP) can be added to the training data and steps 302-310 are applied again from the beginning to the training data that now includes also the NAMDP ("newly created data"). That is, a NAMDP is not processed separately. In contrast, in the online mode described next, each NAMDP is processed separately, without adding it to the training data.

Online Mode

The online mode process is used to detect anomalies in real-time (also called "streaming time") for constantly arriving NAMDPs. A NAMDP that did not participate in the learning (training) phase can be embedded into an embedded space created from the training data, as done in the offline mode. A general overview of the online mode process is shown in FIG. 2B.

There are two general approaches to embed an NAMDP into an embedded space: 1) combine the NAMDP into the training dataset to obtain a "combined" dataset and apply the offline algorithm (steps 302-310 above) to the combined dataset, as explained in the offline process above, or 2) apply the same algorithm as in the offline mode to a training dataset for finding the embedded grid and the density estimation, then embed each NAMDP into the embedded space learned from the training data by applying the OOSE-MGC algorithm to the NAMDP. The advantage of the latter approach is that it is not only potentially less computationally expensive, but also that NAMDPs can be identified in the geometry derived from the training data without the need to re-compute the geometry again and again for each NAMDP.

The online mode process includes two sequential parts:

1. Offline training: a finite dataset of MDPs is chosen as a training dataset. The training dataset is processed in an offline mode as in steps 302-310 in FIG. 3. The output from step 310 is input to the online detection process described in FIGS. 2A and 2B to classify whether a real-time arriving NAMDP is normal or abnormal (anomalous).

2. Online detection of anomalous NAMDPs

Initially, each NAMDP is normalized as in step 302 by using the stored σ and $s_i$, i=1, . . . , n. The normalized NAMDP is then embedded into the lower dimension space created in step 308 by the application of OOSE-MGC. Then, the NAMDP is classified as either normal or abnormal. This is done as in step 310, but here the operation is performed on a NAMDP to find its location in the embedded grid by the application of OOSE-MGC. Another way to find an anomalous NAMDP is to consider the norm of the embedded NAMDP. An anomaly sometimes lies far from most of the training data, which will cause it to be embedded to zero (or close to zero) as a result of the OOSE. Therefore, ENMDPs with small norms (relative to the rest of the MDPs) can be classified as anomalies.

The online algorithm uses the "on-the-fly system modifications" to adjust addition/change/omission of data sources, data types and formats, interfaces, analytic methods and operational modes without halting the system operation.

Experimental Results on Networking Data

Comprehensive evaluations of the performance of the online method for intrusion detection were performed by applying the online algorithm to DARPA datasets from DARPAN. These evaluations included building an intrusion detection system to find attacks against UNIX and Windows NT systems and against Cisco Routers. The network architecture and the background traffic were designed to simulate traffic that is similar to an Air Force base.

The training was on days that did not include attacks. The testing of the online method was performed on two weeks of data. A NAMDPP in each time slice was handled in real-time by the application of the online algorithm (the detection step). The results are presented at the end of each day, after handling 1320 MDPs in real-time (one MDP at a time).

Figure 4:
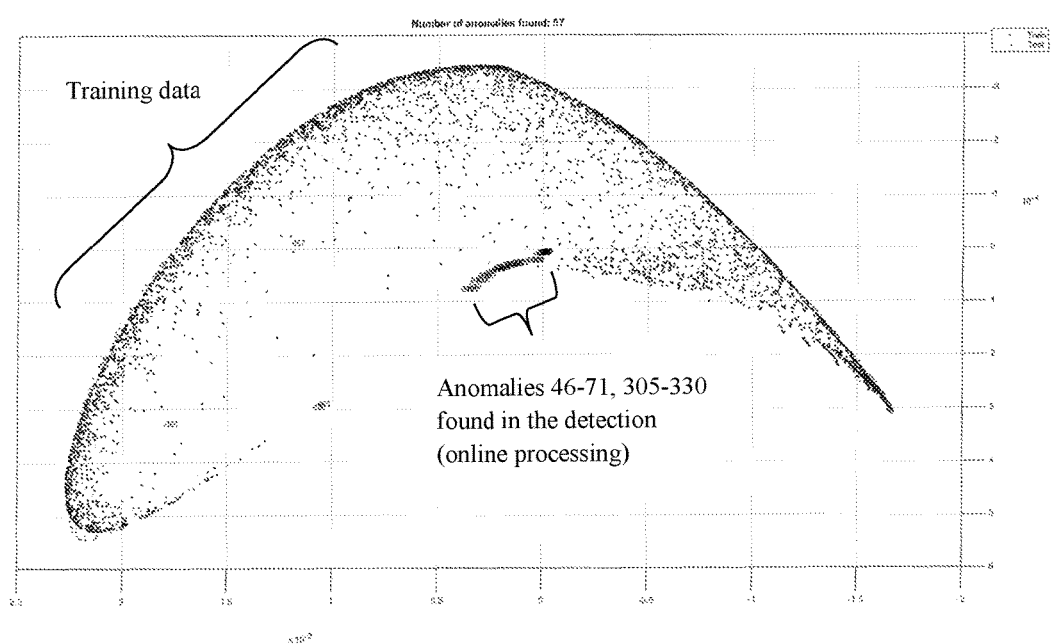
FIG. 4 shows graphically experimental results of online anomaly detection performed with a method and system disclosed herein on DARPAN networking data.

FIG. 4 presents results obtained for Tuesday. Anomalies detected on that day included an attack of type "portsweep" started at time 45 and continued at time 46 to 71 and ended at time 72; and an attack of type "ipsweep" started just after time 305, continued at time 306 to 330 and ended at time 331. The detected anomalies are shown in the figure together with the training set, which was processed separately. The training set, processed offline, did not have any anomalies, as reported in DARPAN.

This disclosure is not intended to be limited by the specific disclosures of embodiments herein. For example, any digital computer system can be configured or otherwise programmed to implement the methods disclosed herein, and to the extent that a particular digital computer system is configured to implement the methods of this disclosure, it is within the scope and spirit of the present disclosure. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other non-transient storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present disclosure.

Accordingly, drawings, tables, and description disclosed herein illustrate technologies related to the invention, show examples of the invention, and provide examples of using the disclosure and are not to be construed as limiting the present invention. Known methods, techniques, or systems may be discussed without giving details, so to avoid obscuring the principles of the disclosure. As it will be appreciated by one of ordinary skill in the art, method and system embodiments disclosed herein can be implemented, modified, or otherwise altered without departing from the principles and spirit of the present disclosure. Therefore, the scope of the present invention should be determined by the following claims and their legal equivalents.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

What is claimed is:

1. A computer system, comprising:
    a) a processing module configurable to receive a plurality of measurements, each measurement being a M-dimensional data point (MDP) wherein M≥3, the processing module further configurable to process the plurality of MDPs using a measure-based Gaussian correlation (MGC) kernel $$K(x, y) = \sum_{r \in M} \exp(-\|x - r\|/\varepsilon) \exp(-\|y - r\|/\varepsilon) q(r),$$

x,y∈X that includes a measure assumption to obtain processed MDPs, and to embed the processed MDPs into a lower dimension embedded space to obtain embedded MDPs (EMDPs) having a distribution represented by the measure assumption;
    b) a detection module configurable to detect an abnormal measurement using only chosen representatives from the distribution of EMDPs and without relying on a signature, the abnormal measurement being indicative of an unknown undesirable event; and
    c) a configuration and operation server operative to configure the processing and detection modules,
        wherein the use of the MGC kernel and of only chosen representatives from the distribution of EMDPs enables the computer system to detect abnormal measurements faster and more efficiently, independently of the intrinsic geometry of data comprised of the measurements.

2. The system of claim 1, wherein the configuration and operation server is operative to configure the processing and detection modules on-the-fly and dynamically, without changing computer system software code and without even halting computer system operation, thereby enhancing the efficiency and performance of the computer system.

3. The system of claim 1, wherein the detection module is further configured to detect the abnormal measurement automatically and without supervision.

4. The system of claim 1, wherein the detection module is further configured to detect the abnormal measurement without use of a rule.

5. The system of claim 1, wherein the detection module is further configured to detect the abnormal measurement without use of a domain expert.

6. The system of claim 1, wherein the unknown undesirable event includes a cyber-threat.

7. The system of claim 1, wherein the unknown undesirable event includes a cyber-attack.

8. The system of claim 1, wherein the unknown undesirable event includes an operational breakdown.

9. The system of claim 1, wherein the unknown undesirable event includes a process malfunction.

10. The system of claim 1, wherein the unknown undesirable event includes a process breakdown.

11. A method, comprising:
    a) providing a computer system comprising a configuration and operation server, a data processing module and a detection module;
    b) by the configuration and operation server, configuring the processing module to receive a plurality of measurements, each measurement being a M-dimensional data point (MDP) wherein M≥3, to process the plurality of MDPs using a measure-based Gaussian correlation (MGC) kernel $$K(x, y) = \sum_{r \in M} \exp(-\|x - r\|/\varepsilon) \exp(-\|y - r\|/\varepsilon) q(r),$$

x,y∈X that includes a measure assumption to obtain processed MDPs, and to embed the processed MDPs into a lower dimension embedded space to obtain embedded MDPs (EMDPs) having a distribution represented by the measure assumption; and
  c) by the configuration and operation server, configuring the detection module to detect an abnormal measurement using only chosen representatives from the distribution of EMDPs and without relying on a signature, the abnormal measurement being indicative of an unknown undesirable event,
    wherein the use of the MGC kernel and of only chosen representatives from the distribution of EMDPs enables the computer system to detect abnormal measurements faster and more efficiently, independently of the intrinsic geometry of data comprised of the measurements.

12. The method of claim 11, wherein the configuring of the processing module and of the detection module is done on-the-fly and dynamically, without changing computer system software code and without even halting computer system operation, thereby enhancing the efficiency and performance of the computer system.

13. The method of claim 11, wherein the configuring the detection module on-the-fly and dynamically further includes configuring the detection module on-the-fly and dynamically to detect the abnormal measurement automatically and without supervision.

14. The method of claim 11, wherein the configuring the detection module on-the-fly and dynamically further includes configuring the detection module on-the-fly and dynamically to detect the abnormal measurement without use of a rule.

15. The method of claim 11, wherein the configuring the detection module on-the-fly and dynamically further includes configuring the detection module on-the-fly and dynamically to detect the abnormal measurement without use of a domain expert.

16. The method of claim 11, wherein the unknown undesirable event includes a cyber-threat.

17. The method of claim 11, wherein the unknown undesirable event includes a cyber-attack.

18. The method of claim 11, wherein the unknown undesirable event includes an operational breakdown.

19. The method of claim 11, wherein the unknown undesirable event includes a process malfunction.

20. The method of claim 11, wherein the unknown undesirable event includes a process breakdown.

* * * * *